Figure 12:
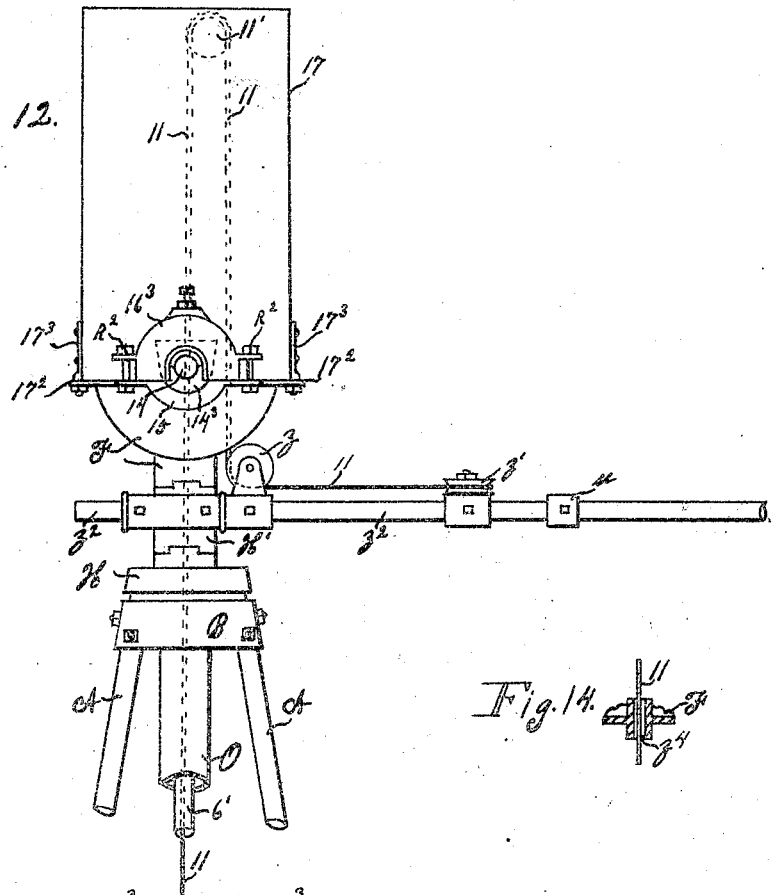

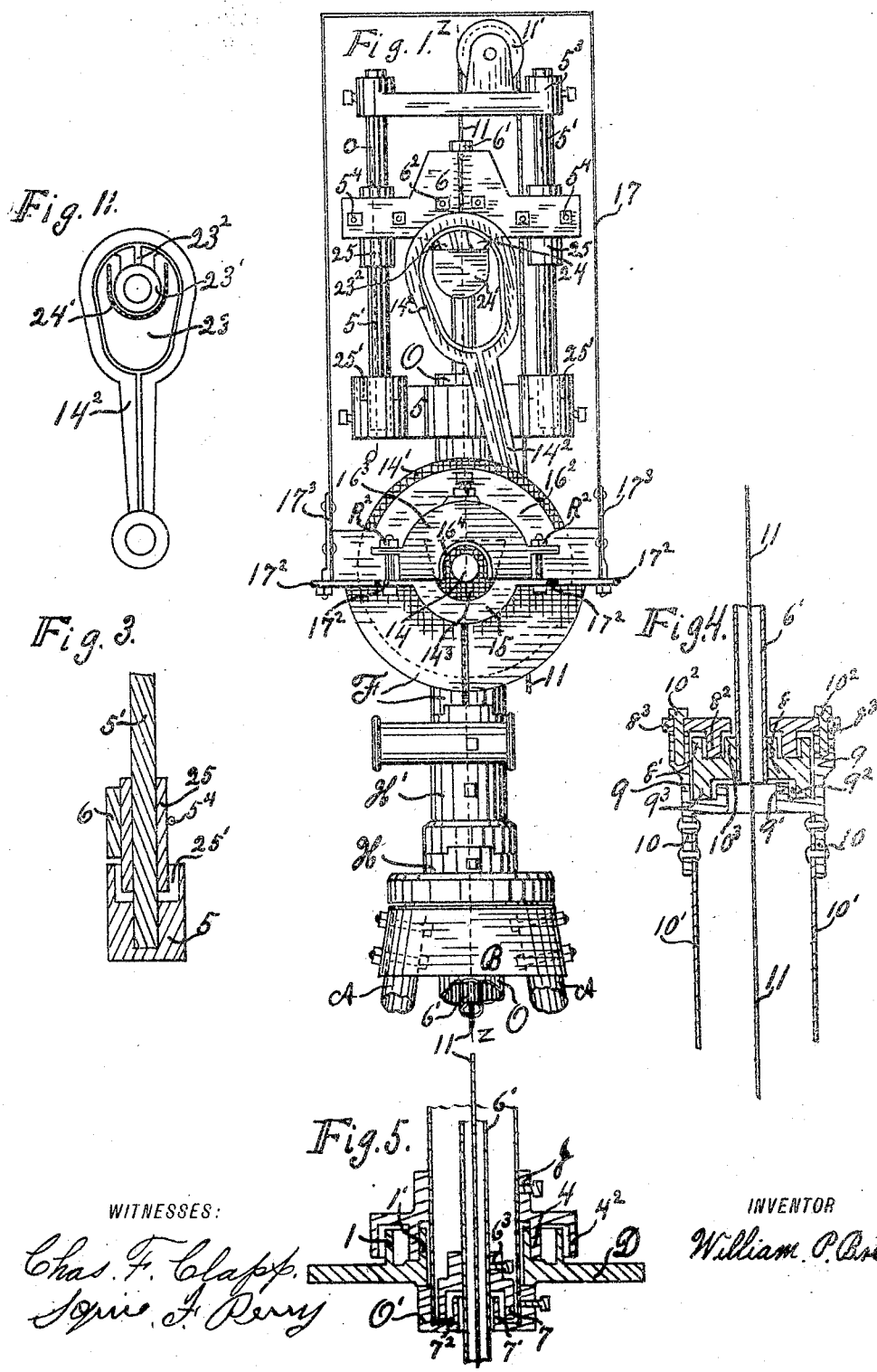

No. 827,611. PATENTED JULY 31, 1906.
W. P. BRETT.
WINDMILL.
APPLICATION FILED OCT. 14, 1895.
3 SHEETS—SHEET 2.
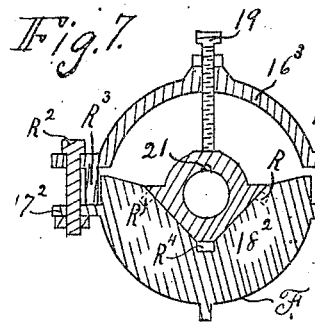
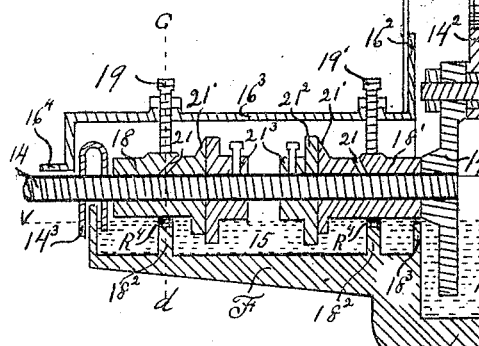
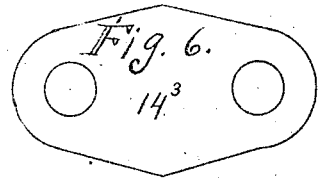
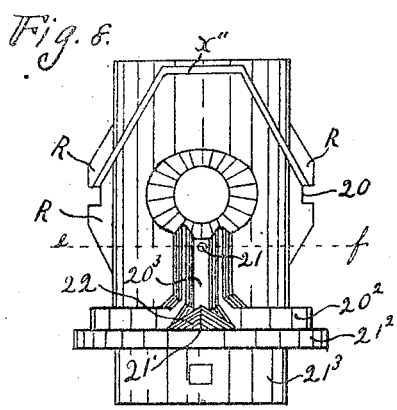
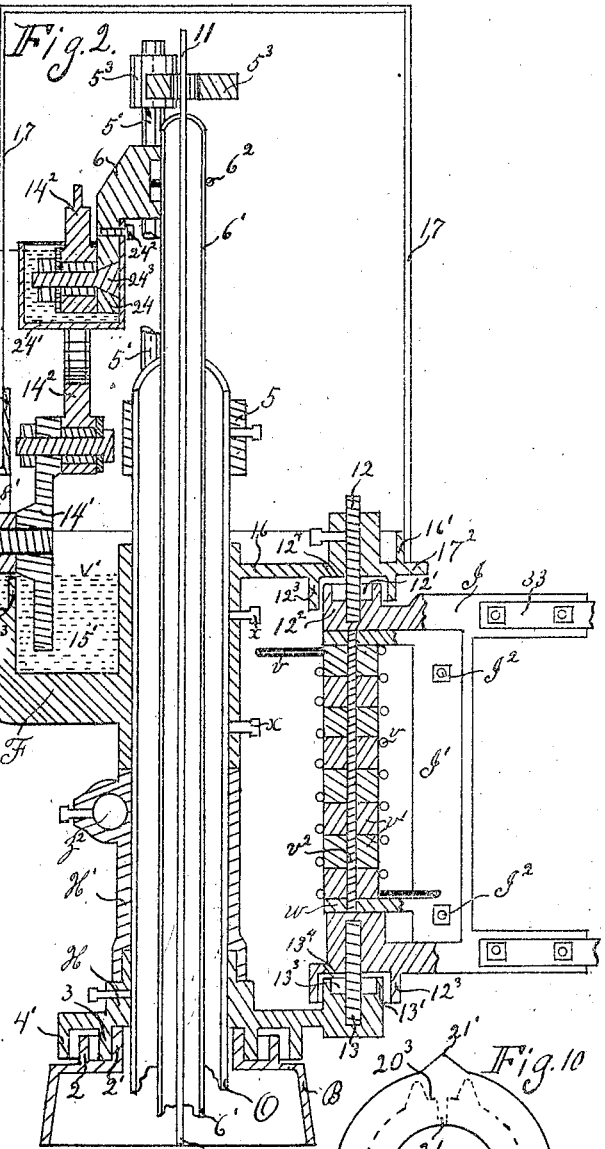
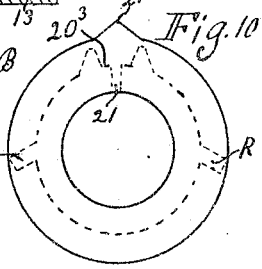
WITNESSES:
William Cameron
James F. White
INVENTOR
William P. Brett No. 827,611. PATENTED JULY 31, 1906.
W. P. BRETT.
WINDMILL.
APPLICATION FILED OCT. 14, 1895.

3 SHEETS—SHEET 3.

WITNESSES.
James T. White
Frank Ribera

INVENTOR.
William P. Brett.

UNITED STATES PATENT OFFICE.

WILLIAM P. BRETT, OF DECATUR, ILLINOIS.

WINDMILL.

No. 827,611.     Specification of Letters Patent.     Patented July 31, 1906.

Application filed October 14, 1895. Serial No. 565,607.

*To all whom it may concern:*

Be it known that I, WILLIAM P. BRETT, a citizen of the United States, residing at Decatur, in the county of Macon and State of Illinois, have invented certain new and useful Improvements in Windmills, of which the following is a specification.

This invention relates especially to the main frame or turn-table and mechanism carried thereby and in close connection therewith in that class commonly known as the "upright" or "vertical" wheel windmill; and the objects of my improvements are, first, to provide means for the automatic lubrication of the main frictional parts of the windmill-head; second, to provide a storm-proof inclosing incasement for said frictional parts and the oil-reservoirs from which they are lubricated; third, to provide means whereby the power-transmitting mechanism may be so arranged as to resist side strains to the best advantage and operate as near as practical in line with the direction of the applied forces; fourth, to provide means whereby the pull-out cord or chain may operate through storm-proof apertures leading into the interior of the main incasement, and, fifth, to provide in a simple, cheap, and effective construction and arrangement of parts a means whereby the oil that is used in lubricating the frictional parts of the windmill-head will be prevented from creeping or flowing onto and dripping to waste from parts adjacent to the surfaces that it is used upon and also whereby the oil that escapes from said surfaces will be retained or conducted into reservoirs where it is available for indefinitely-repeated use upon said frictional surfaces.

As made heretofore windmills have not been amply provided with means for preventing the oil from creeping or flowing onto and going to waste from the parts that are employed to transmit power from the windmill to and through the pivot portion, about the vertical axis of which the main frame or turn-table in this class of windmills must of necessity rotate and oscillate. Usually the oil is allowed to go directly to waste from the bearings, and in some cases it is conducted from the upper frictional surfaces to other frictional parts therebelow, from which either by capillary attraction or the force of gravity, or by both causes, there is a continual movement or drain of oil from the windmill-head which necessitates frequent renewals of the oil-supply, and to avoid this waste of oil and the danger and waste of time in the frequent climbing of the tower are some of the objects to be attained by this invention.

I attain these objects by means of the novel designs and combinations of parts illustrated in the accompanying drawings, in which—

Figure 14:
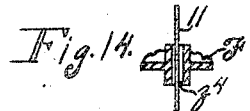
Figure 13:
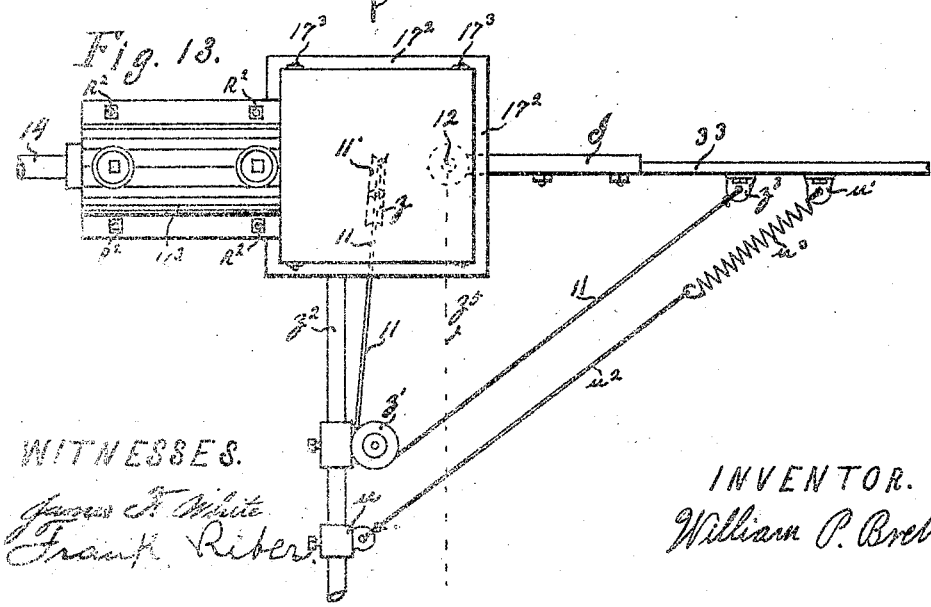

Figure 1 is a front view of the windmill-head with the wheel, the governor-vane, and the front part of the cover portion 17 of the incasement removed; Fig. 2, a vertical sectional view on line Z Z of Fig. 1, the cross-head 6 being near the upper limit of its range of action and the bracket I having only a portion shown in section; Fig. 3, a vertical sectional view on line O O' of Fig. 1; Fig. 4, a vertical sectional view through the pump-rod or reciprocating shaft-swivel; Fig. 5, a vertical sectional view through the lower end of the tubular shaft O and contiguous parts; Fig. 6, a view of the double flexible washer or gasket $14^3$ as it appears before it is folded, as shown in operative position in Fig. 2; Fig. 7, a vertical sectional view through Fig. 2 on line $c\ d$; Fig. 8, a top view of one of the wheel-shaft boxes 18 or 18' and one of the oil-elevating collars $21^2$; Fig. 9, a bottom view of one of the wheel-shaft boxes 18 or 18'; Fig. 10, a view of the flanged end of one of the boxes 18 or 18' and in broken lines shows the outline of a sectional view on line $e\ f$ in Fig. 8; Fig. 11, a front view of the pitman and also shows a vertical cross-sectional view of the upper wrist-pin oil-reservoir 24', indicating its position relative to the downwardly-projecting part $23^2$ of the pitman and the bearing 23', which is formed at the lower portion of the part $23^2$; Fig. 12, another front view of the windmill-head, showing a portion of the governor-vane arm $Z^2$ and partially in solid and partially in broken lines shows the position and course of the pull-out cord 11; Fig. 13, a top view of the parts shown in Fig. 12, further illustrating the position and operation of the cord 11; and Fig. 14, a vertical sectional view through a small portion of the incasement or main frame part F directly above the shive Z, as shown in Fig. 12, illustrating the downwardly-opening aperture $Z^4$, through which the cord or chain 11 is adapted to operate.

Similar letters and figures refer to similar parts throughout the several views.

The main frame or turn-table of the windmill comprises the three parts or castings F, H', and H, and the cover portions $16^3$ and 17 and these parts constitute an inclosing incasement for the main power-transmitting parts of the windmill-head, and by the special form of the part F there is provided the crank-oil reservoir 15', the wheel-shaft oil-reservoir 15, and the vertically-apertured pivot portion through which the tubular shaft O is made to extend and be rigidly fixed therein by means of the set-screws X. The parts H and H' are also adapted to encompass the shaft O, to interlock one with the other, and be firmly fixed thereon, and the casting or part H is provided with the downwardly-projecting annular flange 3, (see Fig. 2,) which is adapted to bear in the annular oil-reservoir which is formed by the two upwardly-projecting annular flanges 2 and 2' of the tower-cap B, thus providing an oil-submerged bearing part for the supporting-bearing of the main frame or turn-table of the windmill-head. The tower-cap B is secured to the top end of the tower-posts A, substantially as shown in Fig. 1, and the annular flange 4' of the part H is adapted to so overhang the flange 2 of the tower-cap as to protect the oil-reservoir inclosed thereby from rain and snow.

The wheel-shaft 14 is mounted in the bearings 18 and 18', which are supported in the reservoir 15 by the cross-flanges or bridges $18^2$, the cover part $16^3$ being firmly bolted to the main frame F by means of the bolts $R^2$, so that the binding-screws 19 and 19' can be adjusted as shown in Figs. 2 and 7, holding said bearings firmly to the bridges $18^2$, the flanges R, (see Figs. 8 and 9,) engaging the bridges, as shown in broken lines in Fig. 7, securing the bearings in a fixed position axially, but permitting them to automatically line with the shaft 14.

The collars $21^3$ are rigidly secured to the shaft 14, so as to abut against the adjacent ends of the bearings and maintain the crank portion 14' against the end of the bearing adjacent thereto, and these bearings are provided with the oil-gathering projections 21', which have the incline surfaces 22 sloping into the channel $20^3$ on the top of the bearings which communicates with the oil-duct 21, leading to the shaft within the bearings. The collars $21^3$ are preferably provided with the flanges $21^2$, which are larger in diameter than the ends of the bearings.

The partition-wall $18^3$ between the reservoirs 15 and 15' is the lowest part of the wall surrounding the reservoir 15 and is so arranged as to drain the surplus oil from 15 into 15' and to maintain an oil-level in reservoir 15 that is above the lower portion of the flanges $21^2$, so that a portion of these flanges is at all times submerged in the oil, and as the collars revolve the flanges carry a portion of the oil over with them, a part of which will flow down on the inclines 22, which lead to channels for conducting it to the interior of the bearings. Thus during the operation of the windmill an abundance of oil is continually flowing onto and through the bearings of the wheel-shaft.

The reservoir 15' is much larger than 15 and is the main storage-reservoir, into which the crank portion 14' is adapted to project and contact with the oil contained therein, so that the pitman end in connection therewith is caused to be lubricated either by direct contact with the oil in the reservoir or by the oil that flows onto it from the crank-disk. As the crank portion 14' revolves it is at all times copiously flooded with oil, a part of which will be continuously flowing onto the end of the bearing 18', so that the incline surface of this bearing will cause a flow of oil into the reservoir 15, from which the wheel-shaft bearings are lubricated, as above described.

The bridges $18^2$ have the channels $R^4$ at a lower level than the lowest point in the wall $18^3$, so as to maintain an even oil-level in all parts of reservoir 15 and to provide an oil-channel which is adapted to conduct the surplus oil back into the main storage-reservoir 15'. Thus it is apparent that as long as there is sufficient oil in reservoir 15' to contact with the crank-disk the proper oil-level will be maintained in the wheel shaft reservoir.

The reservoir 15' and the surfaces adjacent thereto are so surrounded with oil-deflecting flanges as to cause all of the oil that may escape from any of the parts above to drain into the reservoir, where it is continuously available for indefinite or unlimited use on frictional parts of the windmill-head.

To prevent the oil from flowing out on the shaft 14 and going to waste by dripping therefrom, the gasket or washer $14^3$ is provided with two apertures which permit its being doubled and put upon the shaft with a close working fit, substantially as shown in Fig. 2, with one part inside of the end wall of the reservoir and the other part outside thereof and overlapped by the end portion of the cover part $16^3$. This double washer having a tendency to spring back to its normal condition, as shown in Fig. 6, causes it to at all times bind upon the shaft, so as to scrape the oil off and cause it to drip into the reservoir and in like manner will prevent water from following the shaft so as to enter the reservoir.

The pitman $14^2$ is of special form, having each of its bearings disposed at the lower part of a downwardly-projecting portion thereof, thus adapting them both to be operative within upwardly-opening oil-reservoirs while in connection with their coacting parts of the windmill. The oil-reservoir 24' (see Figs. 1, 2, and 11) is carried by the cross-head or reciprocating part 6 and is so mounted in connection therewith as to surround the downwardly-projecting part 24 of the cross-head, the wrist-pin 24³, and the wrist-pin bearing 23' when assembled substantially as shown in Figs. 1 and 2, so that the upper wrist-pin bearing of the pitman is also continuously lubricated by being immersed in oil, which cannot waste or drip therefrom.

The cross-head 6 is provided with the downwardly-projecting slide portions 25, which are adapted to a working engagement with the posts or guides 5', which are anchored at their lower ends in the oil-reservoirs 25', (see Figs. 1 and 3,) into which the lower ends of the slide portions 25 are adapted to project and contact with the lubricant contained therein when they are at or near the lower limit of their range of action, so that a portion of the oil adhering thereto will be spread upon the posts 5', thoroughly lubricating them during the operation of the windmill. The cross-head is also provided with means for the rigid attachment of the plunger-shaft 6', which is preferably in tubular form, so as to be more rigid, and also to provide a suitable central opening through the pivot portion of the windmill-head for the pull-out cord 11, which is adapted to extend from any convenient position therebelow up through the shaft 6' and over the shive 11', from which it is caused to extend downwardly through a suitable opening, as Z⁴, in the incasement part F, (see Fig. 14,) from which it is adapted to be extended and attached to any kind of governing or controlling device desired.

A preferable arrangement for connecting and utilizing the pull-out cord 11 is shown in Figs. 12 and 13, in which Z is a shive anchored just below the aperture Z⁴, and Z' is another shive anchored at a suitable distance out on the rigid arm Z², and the cord 11 is extended partially around these shives and is secured to the clip Z³ on the steering-vane bracket I, which is pivoted to the main frame, as is more fully described hereinafter, and normally but yieldingly stands substantially at right angles to the governor-vane arm Z², so that when a sufficient downward pull is exerted on the lower part of the cord 11 the clip Z³ and bracket I, to which it is attached, will be drawn toward the shive Z' and the bracket caused to take the position indicated by the broken line Z⁵ in Fig. 13 relative to the arm Z² and the wheel-shaft 14, and the windwheel will thereby be held in its inactive position until the cord 11 is released, whereupon it will be automatically thrown to its active position by means of the spring V, which operation is facilitated by means of the continuously-lubricated turn-table and steering-vane pivot-bearings described elsewhere herein.

The clips u and u', spring u³, and cord u² act in conjunction with spring v to hold the bracket I yieldingly in its normal position, so as to avoid all destructive action that might be caused by the swinging operation of the steering-vane, these parts being so proportioned and adjusted as to hold the wind wheel square to the wind until such wind force prevails as will cause the governor to act.

The tubular shaft O is designed to extend downwardly in a vertical position to a suitable distance below the tower-cap B and be rotatably anchored to an anchorage part, as D, somewhat as shown in Fig. 5, in which J is a casting or anchorage part which is provided with the downwardly-projecting annular part 4, which is adapted to bear in an annular oil-reservoir in the anchorage casting D, similar to the bearing described in connection with the tower-cap B.

The part D and the tower-cap B have vertical apertures of such size that the tubular shaft O extends therethrough without contact, so that the only frictional parts of the turn-table pivots are the parts that are submerged in the oil in the reservoirs described above. The reciprocating shaft 6' is longer than the tubular shaft O and has the slide part 6³ (see Fig. 5) rigidly secured to it, which is provided with the downwardly-projecting portion 7, which is so disposed that when the shaft 6' is at the lower limit of its range of action the part 7 will enter the oil in the reservoir 7³ in casting O', which is secured to the lower end of the tubular shaft O just below the anchorage part D. The casting O' also serves as a collar on the shaft O, so as to prevent any lifting of the windmill-head either by the wind or by the action of the shaft 6', and as this shaft reciprocates the oil that adheres to the part 7 will be spread upon the interior of the shaft O, so that these parts, assembled as shown in Fig. 5, provide automatic lubrication for the lower bearing part of the reciprocating shaft 6'.

Fig. 4 illustrates a swivel for the reciprocating shaft 6' and is designed to be carried at the lower end of the shaft, so that when the shaft is at the upper limit of its range of action the swivel will be just below the casting O' on the lower end of the shaft O. This swivel is composed of the two inclosing parts 8³ and 9, which are rigidly secured together by means of the bolts 10², and the inclosed part 8, which is rigidly secured to the lower end of the shaft 6' and is rotatably disposed in the inclosure between the two parts 8³ and 9. The inclosed part 8 is provided on its upper side with an annular oil-reservoir formed by the two annular flanges 8' and 10³, against the bottom portion of which the downwardly-projecting annular rib 8² on the under side of casting 8³ is adapted to bear, and with the downwardly-projecting annular rib 9³ on its under side, which is adapted to bear in the annular oil-reservoir 9², which is formed in the part 9 by the inner upwardly-projecting annular rib 9', and the parts 8³ and 9 are vertically apertured, so as not to contact with either the pull-out cord 11 or the shaft 6', so that the only frictional parts of the swivel are the parts that bear in the oil contained in the oil-reservoirs inclosed within the swivel-castings. Parts 10' are straps or bars secured to the parts 10 of casting 9 and are adapted to extend to any desired distance below and be attached to any suitable mechanism that it may be desired to have actuated by the windmill, and the open space between these two bars permits the cord 11 to pass to one side from this non-rotatable part of the reciprocating shaft, so that it may be operatively disposed therebelow.

The main frame of the windmill is provided with the pivot-shaft 12, which is rigidly secured to the part F (see Fig. 2) and is adapted to a working bearing in the oil-reservoir 12', which is carried by the upper arm of the steering-vane bracket I, and with the oil-reservoir 13³ in the part H, in which the pivot-shaft 13 of the steering-vane bracket I is adapted to a working bearing, and the overhanging annular flanges 12³ are so disposed as to protect these pivots and their oil-reservoirs from rain, snow, and dust, thus providing protection therefor and thorough continuous lubrication for the bearings of the steering-vane of the windmill.

What I claim as my invention, and desire to secure by Letters Patent, is—

1. In a windmill, in combination an incasement constituting the main frame of the mill-head, a forward projection provided with an oil-receptacle and supports for journal-bearings, spaced bearings mounted upon said supports, a rotatable shaft journaled in said bearings and projecting forward through said incasement, means for automatically lubricating said bearings, and an oil-retaining and water-excluding device preferably made of a sheet of yielding material bent to form substantially parallel parts which are apertured so as to make a close fit to said shaft, one of said parallel parts encompassing the shaft inside of the end wall of said receptacle and the other outside and being overlapped, and held close to said end wall, by the cover portion of said receptacle.

2. In a windmill, in combination the main frame of the mill-head provided with a forward projection, a rotatable shaft journaled in said projection and protruding forward therefrom, an oil-receptacle arranged beneath said shaft, means for automatically lubricating the journal portion of said shaft, and an oil-retaining and water-excluding device made of a sheet of flexible yielding substance apertured, doubled, and slidably arranged upon the shaft with a close fit thereto, one end being within and the other without the end wall of said receptacle and held substantially as and for the purpose set forth.

3. In a windmill, in combination the main frame of the mill-head provided with a forward projection, spaced bearings mounted in said projection, a rotatable shaft journaled in said bearings, an oil-receptacle arranged beneath said shaft, parts with oil-elevating disk surfaces larger than and abutting against the adjacent ends of said bearings, oil-channels leading to the portion of the shaft within said bearings, and incline surfaces beginning with an edge that stands substantially within the plane of the end surfaces of the bearings abutting against said disk surfaces and extending downwardly into said channel.

4. In a windmill, in combination a shaft-bearing provided with an oil-channel leading to the interior thereof, a rotatable shaft journaled in said bearing, an oil-receptacle below said shaft, an oil-elevating disk secured to said shaft, contacting with the lubricant in said receptacle, and abutting against the end of said bearing, and an oil-conducting portion, integral with said bearing, and having an edge which stands substantially within the plane of the face of said oil-elevating disk abutting against the bearing and an incline surface leading from said edge into said channel.

5. In a windmill, in combination spaced bearings, a rotatable shaft journaled in said bearings, an oil-receptacle below the shaft, oil-elevating disks secured to said shaft, contacting with the lubricant in said receptacle and abutting against the adjacent ends of said bearings, oil-channels leading from near said disks to the portion of the shaft within said bearings, and oil-gathering portions adjacent to said disks, integral with said bearings, having oil-gathering edges abutting against the faces of said disks and incline surfaces leading from said edges into said channels.

6. In a windmill, in combination a bearing or journal box, a rotatable shaft journaled in said bearing, an oil-elevating portion, carried by said shaft, having a disk surface which is larger than, and abuts against the end surface of said bearing, an oil-receptacle so arranged that the lubricant therein contacts with the lower part of said disk surface, an oil-channel leading from near said disk surface to the portion of the shaft within said bearing, an edge positioned substantially within the plane of the end surface of the bearing against which said disk surface abuts, and an incline-surface portion beginning with said edge and leading into said channel.

7. In a windmill, in combination a bearing or journal box, a rotatable shaft journaled in said bearing, an oil-receptacle beneath said shaft, an oil-elevating portion carried by said shaft in a manner to contact with the lubricant in said receptacle and provided with a substantially vertical surface which abuts against the end surface of said bearing and coacts therewith to deliver oil thereon, an edge substantially coincident with a portion of the plane of said end surface, and an oil-conducting channel leading from said edge to that portion of the shaft within said bearing.

8. In windmills, in combination a bearing or journal box, a rotatable shaft journaled in said bearing, an oil-receptacle arranged below said shaft, an oil-elevating device carried by said shaft, adapted to rotatably contact with the lubricant in said receptacle and coact with the end surface of said bearing to deliver oil thereon, an edge substantially coincident with a portion and forming a part of said end surface, and an oil-conducting channel leading from said edge to that portion of the shaft within the bearing.

9. In a windmill, in combination a bearing or journal-box, a rotatable shaft journaled in said bearing, an oil-receptacle beneath said shaft and bearing, an oil-channel leading from near the end of said bearing to that portion of the shaft therein, an integral part of the end of said bearing having an acute edge portion and an incline surface leading from said edge portion into said channel, and an oil-elevating device carried by said shaft in a manner to contact with the lubricant in said receptacle and provided with a disk surface adapted to coact with said edge portion in delivering oil upon the incline leading into said channel.

10. In windmills, in combination a main frame or turn-table having a vertically-apertured pivotal anchorage portion, a rotatable shaft carried by said frame, power-transmitting mechanism extending through the vertical aperture of the said anchorage portion, in operative connection with the said shaft and adapted to impart motion to other mechanism therebelow during the rotation of the said main frame about the vertical center line of the said anchorage portion, an oil-reservoir arranged below the level of the said shaft, and means whereby a quantity of lubricant stored in the said reservoir is caused to be repeatedly used for lubricating the bearing of the said shaft and the working connection of the said power-transmitting mechanism adjacent thereto upon the rotation of the said shaft.

11. A main frame or turn-table for a windmill having a vertically-apertured pivotal anchorage portion, a rotatable shaft, power-transmitting mechanism extending through the said apertured anchorage portion and in operative connection with the said shaft, an oil-receptacle below the level of the said shaft, and means whereby a quantity of lubricant stored in the said receptacle is automatically and repeatedly applied to lubricate the bearing of the said shaft and the first working connection of the said mechanism adjacent thereto during the operation of the windmill.

12. A main frame or turn-table for a windmill having a vertically-apertured pivotal anchorage portion, a rotatable shaft, power-transmitting mechanism connected with the said shaft and having a portion thereof extending downwardly through the vertical aperture of the said anchorage portion, an oil-receptacle below the level of the said shaft, means for returning the surplus oil from the said shaft into the said receptacle, and means whereby a portion of a quantity of lubricant, stored in said receptacle, is automatically applied to the journal of the said shaft and the first working connection of the said power-transmitting mechanism adjacent thereto upon the rotation of the said shaft.

13. In windmills, in combination the main frame of the windmill-head provided with a shaft-bearing, a rotatable shaft mounted in said bearing, a crank portion secured to said shaft adjacent to one end of said bearing and a part rotatable with and adjustable upon said shaft against the other end, an oil-receptacle arranged so as to immerse the lower portion of said part in the lubricant contained therein, an oil-reservoir so arranged that said crank portion is adapted to operatively contact with the lubricant contained therein, and a surplus oilway leading from said receptacle into said reservoir at a position above the level of the extreme lower portion of said part.

14. A main frame or turn-table for a windmill having a vertically-apertured pivotal anchorage portion, a rotatable shaft carried by said main frame, a power-transmitting device extending through the vertical aperture of the said anchorage portion, a pitman pivoted eccentric to said shaft near one end and operatively connected to the upper portion of the said device near the other end, an oil-receptacle arranged below the level of the said shaft, and means whereby a portion of a quantity of lubricant, stored in said receptacle, is automatically applied so as to lubricate the journal of the said shaft and the said eccentric pitman connection upon the rotation of the said shaft.

15. A main frame or turn-table for a windmill having a vertically-apertured pivotal anchorage portion, a shaft-bearing, a power-transmitting device having a part thereof extending operatively through the vertical aperture of the said anchorage portion, an oil-reservoir arranged below the level of the said shaft, a surplus oil-channel leading from below said shaft into the said reservoir, a pitman pivotally secured eccentric to the said shaft near one end and operatively connected to the upper portion of the said device near the other end, means for applying a portion of a quantity of lubricant, stored in said reservoir, to lubricate the said shaft-bearing and eccentric pitman connection upon the rotation of the said shaft, and a cover portion adapted to coact with the said main frame to inclose the said reservoir and parts of the mechanism adjacent thereto.

16. A main frame or turn-table for a windmill-head having a vertically-apertured pivotal anchorage portion, a shaft-bearing carried by the said main frame, a rotatable shaft mounted in the said bearing, an oil-receptacle below the said shaft, an oil-reservoir arranged at a lower level than the said receptacle, and power-transmitting mechanism operatively connected with the said shaft and adapted to serve as a means for maintaining a constant oil-level in the said receptacle with oil taken from the said reservoir as a source of supply, and having a portion thereof extending downwardly through the vertical aperture of the said anchorage portion and adapted to actuate other mechanism therebelow.

17. In combination, a main frame or turntable for a windmill constituting an incasement for the main shaft-journals and connections of the power-transmitting mechanism of the windmill-head, a vertically-apertured pivotal anchorage portion, an oil-reservoir arranged near the said anchorage portion, and power-transmitting and oil-elevating mechanism operatively mounted within the said incasement, having a part thereof extend operatively through the vertical aperture of the said anchorage portion and another part to operatively contact with the lubricant contained in the said reservoir for the purpose set forth.

18. In a windmill, in combination the main frame of the windmill-head provided with a horizontally-arranged incasement portion, a shaft-bearing mounted within the said portion, a rotatable shaft carried by the said bearing and projecting through the outermost end wall of the said incasement portion, a crank portion carried by the inner end of the said shaft adjacent to the said bearing, an oil-reservoir arranged below the end of the shaft carrying the said crank portion, and oil wiping and retaining device bearing upon the said shaft adjacent to the inside of the said end wall, and an oil-return way leading from below the said shaft-bearing into the said reservoir.

19. In windmills, in combination the main frame of the windmill-head provided with an incasement part for shaft-bearings and a vertically-apertured pivotal anchorage portion, shaft-bearings mounted within said part, a rotatable shaft journaled in and projecting partially beyond the innermost end of said bearings, an oil-receptacle adjacent to said anchorage portion and below the level of said bearings, means in operative connection with said shaft for the automatic lubrication of said bearings, during the operation of the windmill, with oil taken from said receptacle, and a surplus oil-return way leading from below said shaft into said receptacle.

20. In a windmill, in combination the main frame of the mill-head provided with an incasement portion for the wheel shaft-bearing, a shaft-bearing mounted within said incasement, a rotatable shaft journaled in said bearing and projecting through the end wall of said portion, an oil-receptacle within said incasement below said shaft, a part of the cover portion of said incasement adapted to overlap the end wall of said receptacle, and a sheet of yielding material bent to form approximately parallel parts which are apertured so as to be slidable with a close fit upon said shaft, one of said parts encompassing the shaft inside and the other outside of said end wall the outside part being held closely thereto by the overlapping part of said cover portion.

21. The combination, in the main frame of a windmill-head of a substantially vertically-arranged tubular portion rotatably mounted at the upper part of the tower, and an incasement part comprising a portion adapted to encompass and be rigidly secured to the upper part of said tubular portion, an oil-receptacle adjacent to said encompassed upper part, and a lateral extension adapted to carry a rotatable shaft in a substantially horizontal position above and partially overhanging said receptacle.

22. In a windmill, the combination in the main frame of the windmill-head of a substantially vertically-arranged tubular portion pivotally mounted at the top of the mill-tower, an incasement part made rigid with said tubular portion above said tower, an oil-reservoir made integral with said incasement part adjacent to said tubular portion, a lateral extension to said incasement part provided with a bearing for a substantially horizontal rotatable shaft, and a surplus-oil-return passage-way leading from said extension into said receptacle.

23. In a windmill, in combination a substantially vertically-arranged tubular portion pivotally mounted at the top of the tower, an incasement part adjacent to and made rigid with the upper part of said tubular portion, an oil-reservoir arranged adjacent to said tubular portion and made integral with said incasement part, a lateral extension projecting from one side of the upper part of said reservoir and provided with a bearing for a substantially horizontal shaft, a rotatable member journaled in said bearing, a reciprocating part adapted to operate substantially vertically through said tubular portion and means for imparting said reciprocating motion thereto from said rotatable member, means for automatically lubricating the bearings in connection with said rotatable member with oil from said reservoir, and a cover portion adapted to coact with said incasement part to inclose said reservoir, and devices above and in close connection therewith.

24. In a windmill, in combination a substantially vertically-arranged tubular portion rotatably mounted at the top of the mill-tower, an incasement part adjacent to and made rigid with the upper part of said portion and constituting the main frame of the windmill-head, an oil-reservoir carried by said incasement part adjacent to said tubular portion, a rotatable member journaled in a bearing that is above the level of the main portion of said reservoir and so arranged that the surplus lubricant from said bearing is conducted into said reservoir, a reciprocating part adapted to operate through said tubular portion and means for imparting reciprocating motion thereto from said rotatable member, means for automatically lubricating the bearings in connection with said rotatable member with oil from said reservoir, and a cover portion adapted to coact with said incasement part to inclose and protect said reservoir and devices arranged in and above said incasement part.

25. In a windmill, in combination a substantially vertically-arranged tubular portion rotatably mounted at the top of the windmill-tower, an incasement part encompassing said tubular portion above said tower and constituting the main frame of the mill-head, an oil-reservoir made integral with said incasement part adjacent to said tubular portion, a laterally-extended integral portion projecting from the upper part of the side of said reservoir opposite to said tubular portion and comprising an oil-receptacle which has an overflow passage-way leading into said reservoir, and a cover portion adapted to fit upon said incasement part and complete the inclosure for said reservoirs the top end of said tubular portion and the devices mounted in and above said incasement part.

26. In a windmill, in combination a substantially vertically-arranged tubular portion mounted so as to project above the top of the tower, an incasement part mounted upon the upwardly-projecting part of said portion and adapted to rotate about a vertical pivotal center line that falls within the aperture of said tubular portion and constituting the main part of the framework of the mill-head, an oil-receptacle made rigid with said incasement part adjacent to said tubular portion, a shaft rotatably mounted above said receptacle, means for automatically lubricating the bearings in connection with said shaft during the operation of the windmill and returning the surplus lubricant into said receptacle, and a cover portion adapted to fit upon and coact with said incasement part to inclose said reservoir, the upper part of said tubular portion and the devices closely connected therewith.

27. In windmills, in combination the main frame of the windmill-head provided with a substantially horizontally-extending shaft-supporting part, a substantially vertically-arranged vertically-apertured pivotal anchorage portion, a rotatable shaft journaled in said shaft-supporting part and projecting partially beyond the part thereof adjacent to said pivotal anchorage portion, an oil-receptacle carried adjacent to said anchorage portion and below the portion of said shaft adjacent thereto, and automatic means for the repeated use of the oil contained in said receptacle for the lubrication of the journal portion of said shaft and parts directly connected therewith, during the operation of the windmill.

28. In windmills, in combination a substantially vertically-arranged tubular shaft rotatably mounted so that a portion of it projects above the top of the tower, an incasement part rigidly secured to the said portion, an oil-reservoir opening upwardly within the said incasement part adjacent to the said tubular shaft, power-transmitting and oil-elevating mechanism operatively mounted within the said incasement part, a substantially horizontally-arranged shaft-bearing located above and mainly to one side of the said reservoir, and a rotatable shaft mounted in the said bearing and having the portion thereof adjacent to the said reservoir in operative connection with and adapted to actuate the said power-transmitting and oil-elevating mechanism.

29. In a windmill, in combination a main frame or turn-table comprising the lower part of an incasement or inclosure for the lubricated portions of the power-transmitting mechanism of the windmill-head, a vertically-apertured pivotal anchorage portion and an oil-reservoir made integral with the lower portion of the said main frame, a rotatable shaft and a pitman operatively mounted and constituting a part of the said mechanism, and means comprising another part of the said mechanism, in connection with the said shaft and pitman, for automatically lubricating the journal portion of the said shaft and the bearing of the said pitman nearest to the said shaft, with oil from the said reservoir, upon the rotation of the shaft.

30. In a windmill, in combination a reciprocating shaft having a rotatable, and a non-rotatable part swivelly united, the swivel portion comprising a substantially horizontal disk rigidly secured to one of said parts and having an annular oil-receptacle upon its upper side, a central aperture, and a downwardly-projecting annularly-arranged portion on its lower side, two other swivel portions rigidly secured one upon the other, vertically apertured and attached to the other part of said shaft and adapted to inclose said disk portion the upper of said inclosing portions being provided with a downwardly-projecting part adapted to bear in the reservoir on said disk and the lower inclosing part being provided with an annular oil-receptacle adapted to receive the downwardly-projecting portion of said disk.

31. In a windmill, in combination the main frame of the windmill-head provided with the downwardly-projecting annular flanges 3 and 4; the tubular shaft O, the tower-cap B, and the lower bearing-castings D and J.

32. In a windmill, in combination the main frame or turn-table of the head provided with the oil-reservoir 13³ and shaft 12, the vane-bracket provided with the oil-reservoir 12' and the shaft 13, and the overlapping flanges or covers 12³ on said bracket and turn-table respectively substantially as and for the purpose set forth.

33. In a windmill, for the automatic lubrication of the reciprocating or pump-rod swivel, in combination the inclosed member or part 8 rigidly secured to the upper section of said rod, the upper inclosing member provided with the annular rib 8², and the lower inclosing member provided with the reservoir 9² and connected to the lower section of said rod, said upper and lower inclosing members being rigidly secured together for the purpose set forth.

34. In a windmill, in combination a substantially vertically-arranged tubular shaft rotatably mounted with a portion projecting above the top of the tower, an incasement part encompassing said portion and arranged to rotate therewith, substantially vertically-arranged guide-posts projecting upwardly above said incasement part, oil-reservoirs adjacent to the lower ends of said posts, a reciprocating part arranged to slide upon said posts and contact with the lubricant in said reservoirs at the lower end of its stroke, a vertically-apertured inclosed oil-receptacle arranged at the lower end of said tubular shaft, a vertically-apertured part slidably mounted within said tubular shaft at its lower post and adapted, upon its reciprocation, to contact with the lubricant in said receptacle, a substantially vertically-arranged shaft rigidly secured near its upper end to said reciprocating part and extend downwardly through the vertical aperture of and being made rigid with said slidably-arranged part in said tubular shaft, and also extending through the vertical aperture of and projecting below said receptacle, means for imparting motion to said reciprocating part, and a cover portion adapted to fit upon and coact with said incasement part to inclose the working mechanism located within and directly above it.

35. In an automatic lubricating-swivel for the pump-rod or reciprocating shaft of a windmill, the upper and lower inclosing members or parts rigidly secured together, in combination with the inclosed member or part 8 which is free to revolve while so inclosed, said upper inclosing member being provided with the downwardly-projecting portion 8² and said lower inclosing member being provided with the oil-reservoir 9², for the purpose set forth.

36. In windmills, in combination a main frame or turn-table constituting a portion of an incasement or inclosure for the bearings of the power-transmitting parts of the windmill-head, a vertically-apertured pivotal anchorage portion and an oil-reservoir made integral with and constituting a part of the said incasement, a rotatable shaft carried by the said main frame mainly to one side of and above the said reservoir, a series of operatively-connected reciprocating parts mainly above and having a member thereof extending downwardly through the vertical aperture of the said anchorage portion, and means for automatically lubricating the journal portion of the said shaft and the portion of the said reciprocating part that is most nearly connected therewith, with oil taken from the said reservoir, upon the rotation of the said shaft.

37. In combination, an incasement constituting the main frame of the windmill-head, a vertically-apertured pivotal anchorage portion constituting the lower part of the said incasement, a power-transmitting device operatively mounted and extending through the vertical aperture of the said anchorage portion, an oil-receptacle located adjacent to the said anchorage portion, a substantially horizontally-arranged shaft-bearing, a rotatable shaft carried by the said bearing, and a rotatable member rigidly secured to the said shaft, adapted to actuate the said device and to operatively contact with the lubricant contained in the said receptacle.

38. In a windmill in combination an incasement constituting the main frame of the windmill-head, a vertically-apertured pivotal anchorage portion and an oil-reservoir made integral with the said incasement, a power-transmitting device so mounted as to extend through the vertical aperture of the said anchorage portion, a horizontally-arranged shaft-bearing carried within the said incasement, a rotatable shaft journaled in the said bearing, and a circular member mounted upon the said shaft, adapted to actuate the said device and to cause a portion of the lubricant contained in the said reservoir to be applied to the bearings adjacent to the said member upon the rotation of the said shaft.

39. The combination, in a windmill-head, of an incasement part comprising the main frame of the head and adapted to be so mounted as to be rotatable about the vertical center line of a vertically-apertured pivot portion which constitutes a part of said main frame, an oil-reservoir carried by said main frame, a substantially horizontally-arranged rotatable shaft carried by said frame above and partially overhanging said reservoir, a power-transmitting device arranged to be operative through the vertical aperture of said pivot portion during the rotation of the head upon its pivotal bearing, and means in connection with said overhanging part of said shaft for transmitting motion to said power-transmitting device and for applying oil from said reservoir to the bearings of the shaft and parts directly connected therewith, upon the rotation of the shaft.

40. In a windmill, in combination an incasement part constituting that part of the supporting-framework of the windmill-head that includes the head pivotal portion and the central vertical opening therethrough and is adapted to be rotatably mounted at the top of the tower in a manner to permit the operation of a power-transmitting device through said central vertical opening, a power-transmitting device arranged to operate through said central opening, extending downwardly toward the foot of the tower, rotatable devices mounted in connection with and carried by said incasement part that are adapted to transmit power to and through said power-transmitting device to power utilizing or transmitting devices that may be placed at the foot of said tower, an oil-reservoir made integral with said incasement part adjacent to said central opening and adapted to catch the surplus oil that flows from the bearings of the rotatable parts of the devices that are in and above said incasement part, means by which said bearings are automatically lubricated, during the operation of the windmill, with oil taken from said reservoir, and a cover portion adapted to coact with said incasement part to inclose said reservoir, and the devices mounted in and above said incasement part.

41. In windmills, in combination an incasement constituting the main frame or turn-table of the windmill-head, a vertically-apertured pivotal part constituting the anchorage portion of the said main frame, an oil-reservoir within the said incasement adjacent to the said anchorage portion, a power-transmitting device operatively mounted and extending through the vertical aperture of the said anchorage portion, and a rotatable member adapted to actuate the said device and to operatively contact with the lubricant contained in the said reservoir.

42. In combination, an incasement constituting the main frame of the windmill-head, a vertically-apertured pivotal anchorage portion constituting a part of the said incasement, an oil-reservoir within the lower part of the said incasement, power-transmitting and oil-elevating mechanism mounted within the said incasement and having a part of the said power-transmitting mechanism extending operatively through the said anchorage portion, and a horizontally-arranged rotatable shaft located above and mainly to one side of the said reservoir and having the portion thereof adjacent to the said reservoir in operative connection with and adapted to actuate the said power-transmitting and oil-elevating mechanism for the purpose set forth.

43. In windmills, in combination an incasement constituting the main frame or turn-table of the windmill-head and a protecting inclosure for the bearings of the main power transmitting, and the lubricating elements carried by the said head, a vertically-apertured anchorage portion constituting the pivot part of the said turn-table, a shaft-supporting part constituting a portion of the said main frame, and an oil-storage reservoir opening upwardly within the said incasement adjacent to the said anchorage portion and below the level of the shaft position in the said shaft-supporting part.

44. In combination the main frame or turn-table of the windmill-head comprising an incasement part which is adapted to inclose the upper part of the reciprocating mechanism of the said head and a portion of the wheel-shaft, a shaft-supporting part, a vertically-apertured part constituting the pivot portion of the said turn-table, the said reciprocating mechanism, a wheel-shaft, actuating parts or mechanism in operative connection with the said shaft and reciprocating mechanism, and means within the said incasement for the continuous automatic lubrication of the frictional parts of the said shaft and mechanism during the operation of the windmill.

45. In a main frame or turn-table for an automatically-lubricated windmill, in combination an incasement adapted to inclose all of the principal frictional parts of the main power-transmitting members of the windmill-head, a pivot portion provided with a vertical aperture leading into said incasement, a horizontally-arranged wheel-supporting part, and an oil-reservoir so disposed adjacent to the said pivot portion that the oil that escapes from the frictional parts above will collect therein and be available for indefinite or unlimited automatic use on frictional parts thereabove.

46. In a windmill of the character described, in combination the main frame or turn-table of the windmill-head comprising an incasement part which is adapted to inclose the upper portion of the main power-transmitting mechanism including a portion of the wheel-shaft, a shaft-supporting part, a vertically-apertured part which constitutes the pivot portion of the said turn-table, the said power-transmitting mechanism and wheel-shaft, means for lubricant-storage within the said incasement, and means whereby said stored lubricant is adapted to be repeatedly or continuously used to automatically lubricate the frictional parts of the said wheel-shaft and the upper portion of the said power-transmitting mechanism during the rotation of the said wheel-shaft.

47. In an automatically-lubricated windmill, the combination in the main frame or turn-table of the windmill of an inclosing incasement for the principal frictional parts of the main power-transmitting members and lubricating elements of the windmill-head, a vertically-apertured pivot portion, a horizontally-arranged wheel-supporting part and an oil-storage reservoir with the said members and elements, the said reservoir being so disposed that the lubricant that may flow or drip to the lower part of the said incasement will collect therein and be available for repeated automatic use on frictional parts of said members.

48. In a windmill, in combination an incasement part, a rotatable member and a reciprocating part, mounted one above the other and mainly within said incasement part, a pitman eccentrically pivoted to said member near one end, and pivotally connected to said reciprocating part near the other end, a downward projection near the upper end of said pitman, provided at its extremity with one of said pivot-bearings, and oil-reservoirs so mounted that each of the said pivot-bearings is adapted to operatively contact with the lubricant contained in its respective reservoir during the operation of the windmill.

49. In a windmill, in combination an incasement part, a rotatable member and a reciprocating part, mounted one above the other and mainly within the said incasement part, a pitman eccentrically pivoted to said member near one end, and pivotally connected to said reciprocating part near the other end, a downward projection near the upper end of said pitman, provided at its extremity with one of said pivot-bearings, and lubricant and means for its storage within the said incasement part, said lubricant being so disposed that each of the said pivot-bearings is adapted to operatively contact with its respective part of the said lubricant during the operation of the windmill.

50. In a windmill, in combination a main frame or turn-table comprising an incasement part and a vertically-apertured part, said apertured part constituting the pivot portion of said turn-table with the said aperture leading or opening into the interior of said incasement part, a wind-wheel shaft operatively mounted and adapted to actuate power-transmitting mechanism, mounted within the said incasement part, the said power-transmitting mechanism, lubricant and means for its storage within said incasement part, and means in connection with said lubricant whereby it is caused to automatically lubricate the frictional parts of the said shaft and mechanism during the operation of the windmill, said lubricant and mechanism being so disposed that there can be no dripping or waste of the lubricant through the said vertical aperture, resulting from the operation of the windmill.

51. In a windmill of the character described, in combination the main frame or turn-table of the windmill-head comprising an incasement-part, a shaft-supporting part, an oil-receptacle in said shaft-supporting part, a vertically-apertured part constituting the pivot portion of said turn-table, an oil-storage reservoir in said incasement part below the level of said receptacle, and means whereby oil from said reservoir may be utilized to maintain a constant oil-level in said oil-receptacle.

52. In a windmill, in combination a main frame or turn-table, a vertically-apertured part constituting the pivot portion of said main frame, an oil-reservoir in the lower portion of said turn-table, a power-transmitting device carried by said turn-table and having bearings above the oil-level in said reservoir, means whereby said bearings may be lubricated with oil automatically taken from said reservoir, and means whereby the surplus lubricant dripping from said bearings is caused to return into said reservoir.

53. In a windmill, a main frame or turn-table comprising as integral parts thereof a shaft-supporting part, a vertically-apertured pivot portion, an oil-storage reservoir, and an incasement portion, in combination with a rotatable shaft, and a power-transmitting and oil-elevating device, said device being operatively mounted partially within said oil-reservoir and carried by said shaft adjacent to one end of said shaft-supporting part.

54. In a windmill, the combination of a main frame or turn-table provided with a vertically-apertured pivot portion, a shaft-supporting part, and an oil-reservoir which is below and adjacent to one end of said shaft-supporting part, with a rotatable shaft, and a power-transmitting device which is operatively mounted partially within said reservoir and carried by said shaft.

55. In an automatically-lubricated windmill, in combination a main frame or turn-table so pivoted as to be capable of rotation or oscillation about a vertical axis, a motor part carried by said turn-table, operatively-connected power-transmitting devices by means of which said motor part is adapted to actuate mechanism below the pivot portion of said turn-table during the oscillation or rotation thereof about said vertical axis, and upwardly-opening oil-receptacles so disposed that the upper edge portions thereof will embrace or encompass the space vertically below the main frictional and lubricated parts of the said devices whereby the oil that escapes from said frictional and lubricated parts will be retained where it is available for repeated automatic use on the said frictional parts.

56. In an automatically-lubricated windmill, in combination a main frame or turn-table so pivoted at the upper part of a stationary support or tower as to be capable of oscillation or rotation about a vertical axis, a motor part carried by said turn-table, a vertical shaft adapted to actuate mechanism below the pivot portion of the said turn-table, a connecting part by means of which said motor part is adapted to actuate said vertical shaft, and an upwardly-opening oil-receptacle below said connecting part and adapted to receive all of the oil that may escape from the said part whereby it is retained where it is available for indefinite or unlimited automatic use on the frictional surfaces of said connecting part and parts adjacent thereto.

57. In an automatically-lubricated windmill, in combination a main frame or turn-table provided with a vertically-apertured pivot portion and adapted to rotate or oscillate about a vertical axis, a rotatable member, a reciprocating part mounted so as to operate through said vertical aperture, a power-transmitting device connected therewith and adapted to transmit motion from said member to said part, and oil-retaining receptacles so disposed as to receive and hold the oil that escapes from the frictional surfaces of the said device or of the parts that are in immediate connection therewith, where it is available for indefinite or unlimited automatic use on the frictional parts of the said device.

58. In an automatically-lubricated windmill, in combination a main frame or turn-table provided with a vertically-apertured pivot portion and adapted to rotate or oscillate about a vertical axis, a rotatable member, a reciprocating part adapted to operate through the vertical aperture of said pivot portion and to actuate mechanism therebelow during the oscillation or rotation of said main frame about said vertical axis, a power-transmitting device connected therewith and adapted to transmit motion from said member to said part, and an oil-retaining receptacle so disposed as to receive and hold the oil that may escape from said member and the part of said device that is in immediate connection therewith where it is available for repeated automatic use on the said member and part for the purpose set forth.

59. In a windmill, in combination a main frame or turn-table, a tubular shaft made rigid with and comprising a part of the pivot portion of said turn-table, a vertically-movable part mounted above said tubular shaft, a tubular plunger-shaft made rigid with said vertically-movable part and extending downwardly through said tubular shaft, and guide portions, for said vertically-movable part above said tubular shaft and for the lower portion of said plunger-shaft within the lower part of said tubular shaft, said guide portions being inclosed and protected by inclosing incasement portions of said turn-table.

60. In a windmill, in combination a main frame or turn-table, a tubular shaft made rigid with and comprising a part of the pivot portion of said turn-table, a vertically-movable part mounted above said tubular shaft, a tubular plunger-shaft secured to said vertically-movable part and extending downwardly through said tubular shaft, guide portions, for said vertically-movable part above said tubular shaft and for said plunger-shaft within the lower part of the said tubular shaft, means for storing lubricant, and means whereby said stored lubricant may be automatically used repeatedly in lubricating said guide portion.

61. In a windmill, in combination a main frame or turn-table comprising a storm-proof incasement for the main frictional parts of the power-transmitting mechanism of the windmill-head, a vertically-apertured part composing the pivot for said turn-table, a rotatable motor part carried by said turn-table and partially within said incasement, a power-transmitting device adapted to be actuated by said motor part and to transmit power through said vertically-apertured part during the oscillation or rotation of said main frame upon said pivot, means whereby a quantity of lubricant may be carried by said turn-table, and means whereby said lubricant may be automatically used repeatedly in lubricating the respective main frictional parts of said motor part and power-transmitting device.

62. In a windmill, in combination a main frame or turn-table, a vertically-apertured part constituting the pivot portion of said turn-table, a reciprocating part extending operatively through the vertical aperture of said pivot portion, means for storing lubricant near the vertical axis of said pivot portion, and means whereby the principal frictional surfaces of said reciprocating part may be automatically lubricated continuously with said stored lubricant during the operation of the windmill.

63. In a windmill, in combination a main frame or turn-table, a vertically-apertured part constituting the pivot portion of said turn-table, a reciprocating part extending operatively through the vertical aperture of said pivot portion, a rotatable member adapted to actuate said reciprocating part, means for storing lubricant near the vertical axis of said pivot portion, and means whereby the principal frictional parts of said member and reciprocating part may be automatically lubricated repeatedly or continuously with said stored lubricant during the operation of the windmill.

64. In a windmill, in combination a main frame or turn-table, a pivot portion adapting said main frame to be oscillated or rotated about a vertical axis, a steering-vane carried by said main frame, pivotal anchorage parts adapting said vane to oscillate independent of said main frame, and means whereby lubricant may be stored and automatically used repeatedly in lubricating the respective frictional parts of said pivot portion and of said pivotal anchorage parts during the operation of the windmill.

65. In an automatically-lubricated windmill, in combination a main frame or turn-table so pivoted as to be capable of oscillation or rotation about a vertical axis, a rotatable motor part carried by said turn-table, power-transmitting devices by means of which said motor part is adapted to actuate mechanism below the pivot portion of said turn-table during the oscillation or rotation thereof about said vertical axis, and an upwardly-opening oil-reservoir so disposed that the edge portions thereof and, of the surfaces that will drain therein will embrace or encompass space through which vertical lines from all of the oil-escaping points thereabove will fall, whereby the oil-supply of said reservoir is substantially unwastingly maintained where it is available for repeated automatic use on said motor part and parts of said devices.

66. In a windmill, a main frame or turn-table provided with a vertically-apertured pivot portion and adapted to rotate or to oscillate about a vertical axis, a rotatable member carried by the said main frame, a reciprocating device adapted to be actuated by said member and to transmit power through said pivot portion during the rotation or oscillation of said turn-table about said vertical axis, and means whereby lubricant may be stored and automatically used repeatedly on frictional parts of said member and device and whereby the surplus lubricant from said frictional parts will be returned into the said means for lubricant storage.

67. In a windmill, in combination a main frame or turn-table provided with a pivot portion by means of which it is adapted to rotate or to oscillate about a vertical axis, a rotatable motor part carried by said turn-table, a power-transmitting device adapted to transmit power from said motor part to mechanism below said pivot portion during the operation of the windmill, means whereby a quantity of lubricant may be stored, and means whereby said lubricant may be automatically used repeatedly on the respective frictional parts of said motor part and device during their operation.

68. In a windmill, in combination a rotatable shaft, a bearing for said shaft, an oil-receptacle below said bearing, means whereby lubricant may be automatically taken directly from said receptacle and applied to the frictional parts of said shaft and bearing, an oil-storage reservoir below said receptacle, an overflow or spillway leading from said receptacle into said reservoir, and means whereby lubricant may be automatically conveyed from said reservoir into said receptacle.

69. In a windmill, in combination a main frame or turn-table adapted to rotate or to oscillate about a vertical axis, a vertically-apertured part constituting the pivot portion of said turn-table, power-transmitting mechanism mounted to rotate or to oscillate with said turn-table, a tubular reciprocating shaft extending operatively through the vertical aperture of said pivot portion and constituting a part of said power-transmitting mechanism, a vertically-apertured swivel portion rigidly fixed to the lower end of said tubular shaft, another vertically-apertured swivel portion non-rotatably mounted but adapted to be reciprocally actuated by said tubular shaft and said first-named swivel portion, a controller or pull-out device adapted to operate through the vertical apertures of said tubular shaft and swivel portions, and means whereby the frictional parts of said swivel are automatically lubricated continuously during their operation.

70. In a windmill, in combination a main frame or turn-table comprising a storm-proof incasement for the main frictional parts of the power-transmitting mechanism of the windmill-head, a vertically-apertured pivot portion, a reciprocating device comprising a part of said mechanism and adapted to transmit power through said pivot portion during the operation of the windmill, means whereby lubricant may be stored, and means whereby said stored lubricant may be automatically used repeatedly in lubricating the respective frictional parts of said device.

71. In a windmill, in combination a main frame or turn-table comprising a weather-proof inclosing incasement for the reciprocating mechanism of the windmill-head, a pivot portion, comprising a vertical aperture which leads to the interior thereof from the lower portion of said incasement, by means of which said main frame is adapted to rotate or to oscillate about a vertical axis; a vertically-movable part comprising a portion of said mechanism and adapted to transmit power through said vertical aperture, guide portions near the upper and lower portions of the said vertically-movable part, and means for lubricant storage at the lower extremities of said guide portions.

72. In a windmill, in combination a main frame or turn-table adapted to rotate or to oscillate about a vertical axis and comprising an inclosing incasement for the main bearings of the power-transmitting mechanism of the windmill-head and a pivot portion having a vertical aperture which leads from below to the interior of the said incasement, a power-transmitting device adapted to operate through said vertical aperture, a sheave or guide-wheel in the upper portion of said incasement, another vertical aperture at the lower portion of said incasement at one side of the first-named aperture, and a pull-out cord or chain extending through said apertures and over said sheave for the purpose set forth.

73. In a windmill, a main frame or turn-table comprising a shaft-supporting part, a weatherproof inclosing incasement for the main bearings of the power-transmitting mechanism of the windmill-head and a pivot portion by means of which the said main frame is adapted to rotate or to oscillate about a vertical axis, in combination with the said mechanism and means for the automatic lubrication of all of said bearings, and a pull-out device which operates through weather-proof apertures for the purpose set forth.

74. In a windmill, in combination a main frame or turn-table adapted to rotate or to oscillate about a vertical axis and comprising a storm-proof incasement for the main frictional parts of the windmill-head and the means for the automatic lubrication of said parts, a vertically-apertured part constituting the pivot portion of said turn-table, a vertically-apertured power-transmitting device adapted to operate through the vertical aperture of said pivot portion, and a controller device or pull-out cord communicating with the interior of said incasement through the vertical aperture of said power-transmitting device and through another vertical aperture through the under side of said incasement adjacent to said pivot portion.

75. In a windmill, in combination a main frame or turn-table adapted to rotate about a vertical axis and comprising a storm-proof incasement for the main frictional parts of the windmill-head, a vertically-apertured part within and below the lower portion of said incasement and constituting the pivot for said turn-table, and power-transmitting and controlling mechanism adapted to operate through said vertically-apertured part, said controlling mechanism communicating with the interior of said incasement exclusively from and through the under side thereof.

76. In a windmill, a main frame or turn-table comprising a weatherproof incasement portion and a vertically-apertured pivot portion and adapted to rotate or oscillate about a vertical axis, a rotatable shaft having its bearing within said incasement portion, an oil-receptacle below said shaft, means actuated by said shaft whereby said bearing is automatically lubricated with oil from said receptacle, an oil-storage reservoir below said receptacle, means whereby oil is automatically conveyed from said reservoir into said receptacle during the rotation of said shaft, and an overflow or spillway leading from said receptacle into said reservoir.

77. In a windmill, in combination a main frame or turn-table comprising an incasement for the main frictional parts of the windmill head, a vertically-apertured part composing the pivot for said turn-table, a power-transmitting device partially within said incasement and adapted to operate through said turn-table pivot during the operation of the windmill, means whereby a quantity of lubricant may be stored, and means whereby said lubricant may be automatically used repeatedly in lubricating the respective frictional parts of said device.

78. In a windmill, in combination a main frame or turn-table, a vertically-apertured part constituting the pivot for said turn-table, a rotatable motor part, a power-transmitting device adapted to be actuated by said motor part and to operate through said pivot during the operation of the windmill, means whereby lubricant may be stored, and means whereby said lubricant may be automatically used repeatedly in lubricating respective frictional parts of said device and motor part.

79. In a windmill, in combination a main frame or turn-table adapted to rotate about a vertical axis, a vertically-apertured part composing the pivot for said turn-table, a rotatable motor part, a power-transmitting device adapted to be reciprocally actuated by said motor part and to operate through said turn-table pivot, a swivel comprising a rotatable and a non-rotatable part relative to said device and adapted to be reciprocally actuated by the same, means whereby lubricant may be stored, and means for automatically using said lubricant repeatedly in lubricating the respective frictional parts of said motor part, device and swivel.

80. In a windmill, in combination a main frame or turn-table comprising a storm-proof incasement for the main frictional parts of the windmill-head, a vertically-apertured pivot for said turn-table, a rotatable motor part, a power-transmitting device adapted to operate through the vertical aperture of said pivot and to be actuated by said motor part, means whereby a quantity of lubricant may be stored adjacent to the respective bearing portions of said device, and means whereby said lubricant is automatically used repeatedly on the respective frictional parts of said bearing portions during the operation of the windmill.

81. In a windmill, in combination a main frame or turn-table adapted to rotate about a vertical axis and provided with storm-proof protection for the main frictional parts and lubricating elements of the windmill-head, a pivot portion for said turn-table, a rotatable motor part carried by the turntable, a power-transmitting device adapted to be actuated by said motor part and to actuate other devices below said pivot portion during the operation of the windmill, means whereby lubricant may be stored, and means whereby said lubricant may be automatically used repeatedly and with substantially no wastage on the respective frictional surfaces of said motor part and device during their operation.

82. In a windmill, in combination a main frame or turn-table, a pivot portion for said turn-table, having a vertical axis, a rotatable motor part carried by the said main frame, a power-transmitting device adapted to be actuated by said motor part and to actuate other devices below said pivot portion during the operation of the windmill, means for storing lubricant, and means whereby respective frictional parts of said motor part and device are automatically flushed repeatedly with said lubricant during the operation of the windmill.

83. In a windmill, in combination a main frame or turn-table, a pivot portion by means of which said turn-table is adapted to operate about a vertical axis, a rotatable motor part carried by said turn-table, a power-transmitting device adapted to be actuated by said motor part and to actuate other devices, that may be located below said pivot portion, during the operation of the said turn-table about said vertical axis, and means whereby lubricant may be stored and automatically used repeatedly, and substantially without wastage from said means of storage, in lubricating the respective frictional parts of the said power-transmitting device.

84. In a windmill, in combination a main frame or turn-table adapted to rotate about a vertical axis, a vertically-apertured part constituting the pivot for said turn-table, a reciprocating power-transmitting device adapted to operate through the vertical aperture of said pivot portion and comprising a swivel portion, an incasement for the frictional surfaces thereof and composing a part of said swivel portion, a controller or pull-out device adapted to be actuated from below and to operate through said swivel portion, and means whereby lubricant may be stored within and carried by said swivel portion substantially as and for the purpose set forth.

85. In a windmill, a windmill-head comprising a main frame or turn-table provided with a pivot portion by means of which it is adapted to operate about a vertical axis, a rotatable motor part, and power-transmitting mechanism adapted to transmit power from said motor part to other mechanism below said pivot portion during the operation of said turn-table about said axis, in combination with a pivotally-mounted vane, and means whereby lubricant may be stored adjacent thereto and automatically used repeatedly in lubricating the respective pivot-bearings of said turn-table and vane.

86. In windmills, in combination a main frame or turn-table provided with a pivot portion by means of which it is adapted to operate about a vertical axis, a rotatable motor part carried by said turn-table, a power-transmitting device adapted to be actuated by said motor part and to actuate other devices, that may be located below said pivot portion, during the operation of said turn-table about said vertical axis, and means whereby lubricant may be stored and automatically used to lubricate frictional parts of the said power-transmitting device and whereby the portion of the lubricant that escapes from said frictional parts will be collected and retained in said storage means for repeated automatic use upon said frictional parts.

87. In a windmill, in combination an inclosing incasement comprising a wheel-shaft-supporting part and a cover portion, a substantially horizontal wheel-shaft journaled in said shaft-supporting part and extending to the exterior thereof from within said incasement, a gasket embracing said shaft exterior to said shaft-supporting part, and an overhanging part of said cover portion adapted to retain said gasket against the said shaft-supporting part.

88. In a windmill, in combination an inclosing incasement comprising a wheel-shaft-supporting part, an oil-receptacle within said incasement, an outwardly-projecting rotatable shaft journaled in said supporting part, means for automatically lubricating the journal portion of said shaft with oil from said receptacle, a storm-excluding member embracing said shaft externally to said supporting part, and a cover portion adapted in conjunction with said supporting part to embrace the upper portion of said member.

89. In a windmill, in combination an inclosed oil-receptacle, a substantially horizontal rotatable shaft mounted above the oil-level of said receptacle and projecting externally beyond the wall of the receptacle incasement, means for automatically lubricating the journal portion of said shaft with oil from said receptacle, a gasket embracing said shaft exterior to said wall, and a cover portion for said gasket adapted to overlap and press the upper portion thereof against the said wall.

90. In a windmill, in combination a main frame or turn-table, a pivot portion by means of which said turn-table is adapted to rotate or oscillate about a vertical axis, a rotatable motor part carried by said turn-table, a power-transmitting device adapted to be actuated by said motor part and to actuate other devices, that may be mounted below said pivot portion, during the rotation or oscillation of said turn-table about said vertical axis, and means whereby lubricant may be stored and employed in indefinite continuous use automatically and substantially without wastage in lubricating the frictional parts of said power-transmitting device during the operation of the windmill.

91. In a windmill, in combination a main frame or turn-table, a pivot portion by means of which said turn-table is adapted to operate about a vertical axis, a rotatable motor part carried by said turn-table, a power-transmitting device adapted to be actuated by said motor part and to actuate other devices below said pivot portion during the operation of said turn-table about said vertical axis, and means whereby lubricant may be stored and used an indefinite number of times automatically and substantially without wastage in lubricating the frictional parts of said power-transmitting device during the operation of the windmill.

92. In a windmill, in combination a main frame or turn-table, a pivot portion by means of which said turn-table is adapted to operate about a vertical axis, a rotatable motor part carried by said turn-table, a power-transmitting device adapted to be actuated by said motor part and to actuate other devices below said pivot portion during the operation of said turn-table about the said vertical axis, means whereby lubricant may be stored and employed in indefinitely-repeated use automatically and substantially without wastage in lubricating said device during the operation of the windmill, and an incasement portion for the lubricating and lubricated elements of the said power-transmitting device.

93. In a windmill, in combination a main frame or turn-table, a pivot portion by means of which said turn-table is adapted to operate about a vertical axis, a rotatable motor part carried by said turn-table, a pitman adapted to be actuated by said motor part and by means of suitable connections to actuate mechanism below said pivot portion during the operation of said turn-table about said vertical axis, and means whereby lubricant may be stored and employed in indefinitely-repeated use automatically and substantially without wastage in lubricating the frictional parts of said pitman during the operation of the windmill.

WILLIAM P. BRETT.

Witnesses:
   CHAS. F. CLAPP,
   SQUIRE F. PERRY.